(12) United States Patent
Li et al.

(10) Patent No.: US 9,727,586 B2
(45) Date of Patent: Aug. 8, 2017

(54) INCREMENTAL VISUAL QUERY PROCESSING WITH HOLISTIC FEATURE FEEDBACK

(71) Applicant: Samsung Electronics Co., LTD, Suwon-si, Gyeonggi-do (KR)

(72) Inventors: Zhu Li, Plano, TX (US); Ankur Saxena, Dallas, TX (US); Abhishek Nagar, Garland, TX (US); Gaurav Srivastava, Dallas, TX (US); Kong Posh Bhat, Plano, TX (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 266 days.

(21) Appl. No.: 14/048,988

(22) Filed: Oct. 8, 2013

(65) Prior Publication Data

US 2014/0101195 A1 Apr. 10, 2014

Related U.S. Application Data

(60) Provisional application No. 61/712,054, filed on Oct. 10, 2012, provisional application No. 61/748,372, filed on Jan. 2, 2013, provisional application No. 61/750,684, filed on Jan. 9, 2013, provisional application No. 61/812,646, filed on Apr. 16, 2013, provisional application No. 61/859,037, filed on Jul. 26, 2013.

(51) Int. Cl.
*G06F 17/30* (2006.01)

(52) U.S. Cl.
CPC .. *G06F 17/30277* (2013.01); *G06F 17/30247* (2013.01)

(58) Field of Classification Search
CPC ............... G06F 17/30247; G06F 17/30277
See application file for complete search history.

(56) References Cited

U.S. PATENT DOCUMENTS 8,401,307 B1 * 3/2013 Rowe et al. ............... 382/201
8,948,518 B2 * 2/2015 Xin et al. .................. 382/201
(Continued)

FOREIGN PATENT DOCUMENTS

WO    WO2012/100819    8/2012

OTHER PUBLICATIONS

International Search Report dated Jan. 23, 2014 in connection with International Patent Application No. PCT/KR2013/009062, 3 pages.
(Continued)

*Primary Examiner* — Scott A Waldron (57) ABSTRACT

To reduce communication costs and computational complexity, only a subset of ranked SIFT points within a query image for a visual search request is transmitted to the visual search server in each iteration of an incremental search. For each candidate match, a flag identifying the matching points is returned by the server for use in computing holistic (e.g., histogram) information for a bounding box within the query image including the matching points. Distance from that query image holistic information is used to reject images from a short list used for a subsequent iteration, if any. If all images are rejected or a match criteria is met during one iteration, the search may terminate early without consideration of remaining SIFT points.

20 Claims, 5 Drawing Sheets

(56) References Cited

U.S. PATENT DOCUMENTS

| | | | |
|---|---|---|---|
| 8,988,556 B1* | 3/2015 | Karakotsios et al. | 348/231.2 |
| 2007/0009159 A1 | 1/2007 | Fan | |
| 2007/0179921 A1* | 8/2007 | Zitnick et al. | 706/20 |
| 2008/0298643 A1* | 12/2008 | Lawther et al. | 382/118 |
| 2009/0245573 A1* | 10/2009 | Saptharishi et al. | 382/103 |
| 2009/0313239 A1 | 12/2009 | Wen et al. | |
| 2010/0228632 A1* | 9/2010 | Rodriguez | 705/14.66 |
| 2011/0007174 A1 | 1/2011 | Bacivarov et al. | |
| 2011/0299770 A1* | 12/2011 | Vaddadi et al. | 382/165 |
| 2012/0109993 A1 | 5/2012 | Reznik | |
| 2013/0016180 A1* | 1/2013 | Ono | 348/36 |
| 2013/0016912 A1* | 1/2013 | Li et al. | 382/197 |

OTHER PUBLICATIONS

Written Opinion of International Searching Authority dated Jan. 23, 2014 in connection with International Patent Application No. PCT/KR2013/009062, 6 pages.

ISO/IEC JTC1/SC29/WG11/W12929; "Test Model 3: Compact Descriptors for Visual Search"; Video Subgroup; Jul. 2012; Stockholm, SE; 34 pages.

ISO/IEC JTC1/SC29/WG11 N12551; "Description of Core Experiments on Compact descriptors for Visual Search"; Video Subgroup; Feb. 2012; San Jose, US; 10 pages.

ISO/IEC JTC1/SC29/WG11 MPEG2011/M22672; "Telecom Italia's response to the MPEG CfP for Compact Descriptors for Visual Search"; Nov. 2011; Geneva, CH; 10 pages.

ISO/IEC JTC1/SC29/WG11/N12202; "Evaluation Framework for Compact Descriptors for Visual Search"; Jul. 2011; Torino, IT; 14 pages.

ISO/IEC JTC1/SC29/WG11 MPEG2012/M23938; "Examples of feature selection to boost retrieval performance"; Feb. 2012; San Jose, US; 6 pages.

Luby; et al.; IETF RFC5053, Research Gate; "Raptor Forward Error Correction Scheme for Object Delivery"; Network Working Group; Oct. 2007; 47 pages.

David G. Lowe; "Distinctive Image Features from Scale-Invariant Keypoints"; Computer Science Department University of British Columbia; Jan. 5, 2004; 28 pages.

Vedaldi, et al.; "VLFeat-An open and portable library of computer vision algorithms"; ACM Multimedia; 2010; 4 pages.

Extended European Search Report dated Jun. 3, 2016 in connection with European Application No. 13844997.0, 5 pages.

Rouhollah Rahmani, et al., "Localized Content Based Image Retrieval", Nov. 10, 2005, XP055275475, pp. 227-236.

\* cited by examiner

INCREMENTAL VISUAL QUERY PROCESSING WITH HOLISTIC FEATURE FEEDBACK

This application hereby incorporates by reference U.S. Provisional Patent Application No. 61/712,054, filed Oct. 10, 2012, entitled "INCREMENTAL VISUAL QUERY PROCESSING WITH HOLISTIC FEATURE FEEDBACKS," U.S. Provisional Patent Application No. 61/748,372, filed Jan. 2, 2013, entitled "ROBUST KEYPOINT FEATURE SELECTION FOR VISUAL SEARCH WITH SELF MATCHING SCORE," U.S. Provisional Patent Application No. 61/750,684, filed Jan. 9, 2013, entitled "TWO WAY LOCAL FEATURE MATCHING TO IMPROVE VISUAL SEARCH ACCURACY," U.S. Provisional Patent Application No. 61/812,646, filed Apr. 16, 2013, entitled "TWO WAY LOCAL FEATURE MATCHING TO IMPROVE VISUAL SEARCH ACCURACY," and U.S. Provisional Patent Application Ser. No. 61/859,037, filed Jul. 26, 2013, entitled "TWO WAY LOCAL FEATURE MATCHING TO IMPROVE VISUAL SEARCH ACCURACY."

TECHNICAL FIELD

The present disclosure relates generally to image matching during processing of visual search requests and, more specifically, to reducing computational complexity and communication overhead associated with a visual search request submitted over a wireless communications system.

BACKGROUND

Mobile query-by-capture applications (or "apps") are growing in popularity. Snap Tell is a music, book, video or video game shopping app that allows searching for price comparisons based on a captured image of the desired product. Vuforia is a platform for app development including vision-based image recognition. Google and Baidu likewise offer visual search capabilities.

Among the technical challenges posed by such functionality is efficient image indexing and visual search query processing. In particular, processing visual search requests transmitted over wireless communications systems necessitates consideration of bandwidth usage by the request process.

There is, therefore, a need in the art for efficient visual search request processing.

SUMMARY

To reduce communication costs and computational complexity, only a subset of ranked SIFT points within a query image for a visual search request is transmitted to the visual search server in each iteration of an incremental search. For each candidate match, a flag identifying the matching points is returned by the server for use in computing holistic (e.g., histogram) information for a bounding box within the query image including the matching points. Distance from that query image holistic information is used to reject images from a short list used for a subsequent iteration, if any. If all images are rejected or a match criteria is met during one iteration, the search may terminate early without consideration of remaining SIFT points.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 is a high level block diagram of the functional components of the wireless device of FIG. 1B;

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein:

[REF1]—Test Model 3: Compact Descriptor for Visual Search, ISO/IEC/JTC1/SC29/WG11/W12929, Stockholm, Sweden, July 2012;

[REF2]—CDVS, Description of Core Experiments on Compact descriptors for Visual Search, N12551, San Jose, Calif., USA: ISO/IEC JTC1/SC29/WG11, February 2012;

[REF3]—ISO/IEC JTC1/SC29/WG11/M22672, Telecom Italia's response to the MPEG CfP for Compact Descriptors for Visual Search, Geneva, CH, November 2011;

[REF4]—CDVS, Evaluation Framework for Compact Descriptors for Visual Search, N12202. Turin, Italy: ISO/IEC JTC1/SC29/WG11, 2011;

[REF5]—CDVS Improvements to the Test Model Under Consideration with a Global Descriptor, M23938, San Jose, Calif., USA: ISO/IEC JTC1/SC29/WG11, February 2012;

[REF6]—IETF RFC5053, Raptor Forward Error Correction Scheme for Object Delivery;

[REF7]—Lowe, D. (2004), Distinctive Image Features from Scale-Invariant Keypoints, International Journal of Computer Vision, 60, 91-110; and

[REF8]—Andrea Vedaldi, Brian Fulkerson: "Vlfeat: An Open and Portable Library of Computer Vision Algorithms," ACM Multimedia 2010: 1469-1472.

Mobile visual search using Content Based Image Recognition (CBIR) and Augmented Reality (AR) applications are gaining popularity, with important business values for a variety of players in the mobile computing and communication fields. One key technology enabling such applications is a compact image descriptor that is robust to image recapturing variations and efficient for indexing and query transmission over the air. As part of on-going Motion Picture Expert Group (MPEG) standardization efforts, definitions for Compact Descriptors for Visual Search (CDVS) are being promulgated (see [REF1] and [REF2]).

Figure 1:
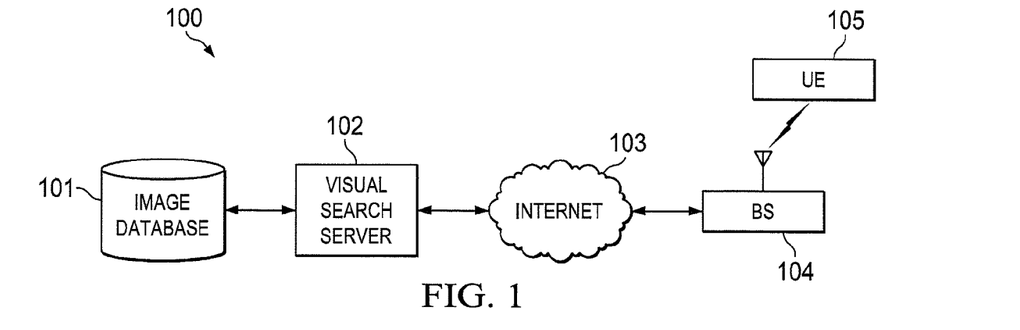
FIG. 1 is a high level diagram illustrating an exemplary wireless communication system within which incremental visual query processing with holistic feature feedback may be performed in accordance with various embodiments of the present disclosure.

FIG. 1 is a high level diagram illustrating an exemplary network within which incremental visual query processing with holistic feature feedback may be performed in accordance with various embodiments of the present disclosure. The network 100 includes a database 101 of stored global descriptors regarding various images (which, as used herein, includes both still images and video), and possibly the images themselves. The images may relate to geographic features such as a building, bridge or mountain viewed from a particular perspective, human images including faces, or images of objects or articles such as a brand logo, a vegetable or fruit, or the like. The database 101 is communicably coupled to (or alternatively integrated with) a visual search server data processing system 102, which processes visual searches in the manner described below. The visual search server 102 is coupled by a communications network, such as the Internet 103 and a wireless communications system including a base station (BS) 104, for receipt of visual searches from and delivery of visual search results to a user device 105, which may also be referred to as user equipment (UE) or a mobile station (MS). As noted above, the user device 105 may be a "smart" phone or tablet device capable of functions other than wireless voice communications, including at least playing video content. Alternatively, the user device 105 may be a laptop computer or other wireless device having a camera or display and/or capable of requesting a visual search.

Figure 1A:
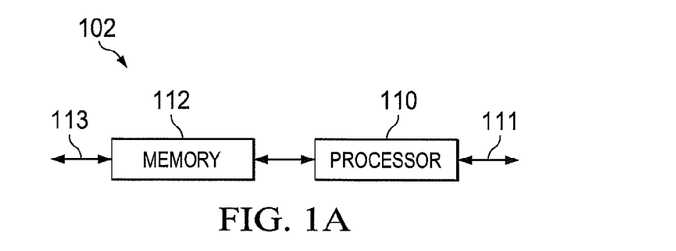
FIG. 1A is a high level block diagram of the functional components of the visual search server from the network of FIG. 1.
Figure 1B:
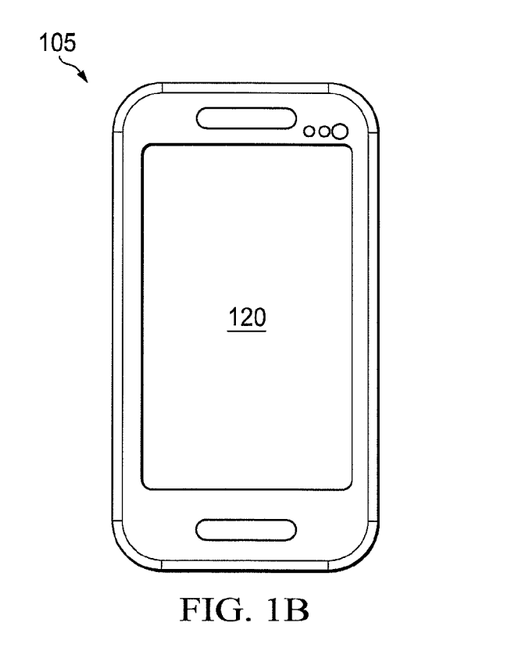
FIG. 1B is a front view of wireless device from the network of FIG. 1.
Figure 1C:
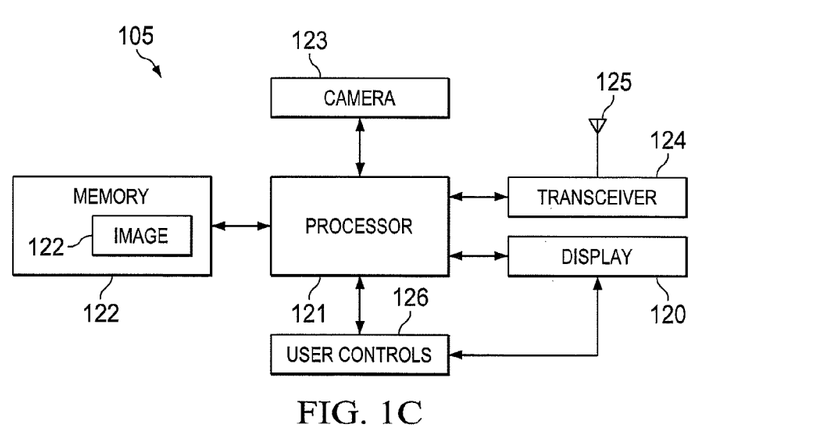

FIG. 1A is a high level block diagram of the functional components of the visual search server from the network of FIG. 1, while FIG. 1B is a front view of wireless device from the network of FIG. 1 and FIG. 1C is a high level block diagram of the functional components of that wireless device.

Visual search server 102 includes one or more processor(s) 110 coupled to a network connection 111 over which signals corresponding to visual search requests may be received and signals corresponding to visual search results may be selectively transmitted. The visual search server 102 also includes memory 112 containing an instruction sequence for processing visual search requests in the manner described below, and data used in the processing of visual search requests. The memory 112 in the example shown includes a communications interface for connection to image database 101.

User device 105 is a mobile phone and includes an optical sensor (not visible in the view of FIG. 1B) for capturing images and a display 120 on which captured images may be displayed. A processor 121 coupled to the display 120 controls content displayed on the display. The processor 121 and other components within the user device 105 are powered by a battery (not shown), which may be recharged by an external power source (also not shown), or alternatively may be powered by the external power source. A memory 122 coupled to the processor 121 may store or buffer image content for playback or display by the processor 121 and display on the display 120, and may also store an image display and/or video player application (or "app") 122 for performing such playback or display. The image content being played or display may be captured using camera 123 (which includes the above-described optical sensor) or received, either contemporaneously (e.g., overlapping in time) with the playback or display or prior to the playback/display, via transceiver 124 connected to antenna 125—e.g., as a Short Message Service (SMS) "picture message." User controls 126 (e.g., buttons or touch screen controls displayed on the display 120) are employed by the user to control the operation of mobile device 105 in accordance with known techniques.

In the exemplary embodiment, the image content within mobile device 105 is processed by processor 121 to generate visual search query image descriptor(s). Thus, for example, a user may capture an image of a landmark (such as a building) and cause the mobile device 105 to generate a visual search relating to the image. The visual search is then transmitted over the network 100 to the visual search server 102.

Figure 2:
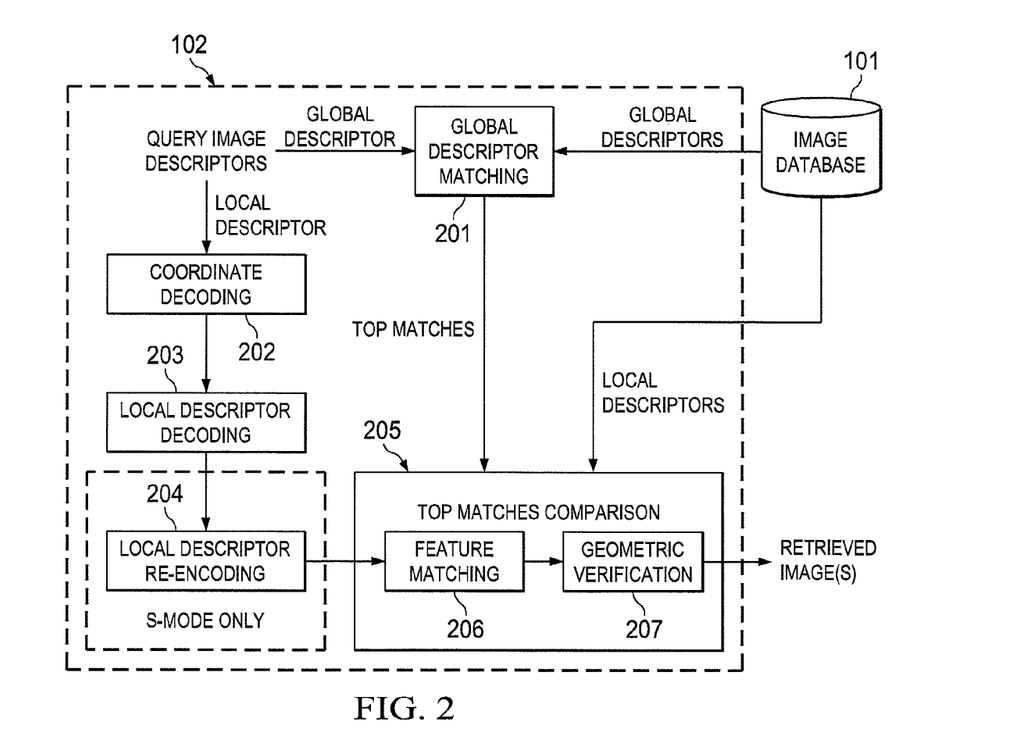
FIG. 2 illustrates, at a high level, the overall compact descriptor visual search pipeline exploited within a visual search server in accordance with embodiments of the present disclosure.

FIG. 2 illustrates, at a high level, the overall compact descriptor visual search pipeline exploited within a visual search server in accordance with embodiments of the present disclosure. Rather than transmitting an entire image to the visual search server 102 for deriving a similarity measure known images, the mobile device 105 transmits only descriptors of the image, which may include one or both of global descriptors such as the color histogram and texture and shape features extracted from the whole image and/or local descriptors, which are extracted using (for example) Scale Invariant Feature Transform (SIFT) or Speeded Up Robust Features (SURF) from feature points detected within the image and are preferably invariant to illumination, scale, rotation, affine and perspective transforms.

In a CDVS system, visual queries may be processed in two steps: In the first step, a short list is retrieved based on a global feature [REF5] that captures the local descriptor(s) distribution, using global descriptor matching 201 with global descriptors from image database 101. To ensure certain recall performance, this short list is usually large, with hundreds of images. Therefore, in the second step, local descriptors are utilized in a re-ranking process that will identify the true matches from the short list. Coordinate decoding 202 and local descriptor decoding 203 from the local descriptor from the image search query are determined, and the local descriptor re-encoding 204 may optionally be performed in software (S-mode) only. Top match comparison 205 from the short list of top matches in the global descriptor matching 201 is then performed using feature matching 206 and geometric verification 207, to determine the retrieved image(s) information. Obviously as the image database 101 size grows, especially in real world applications where repositories typically consists of billions of images, the short list will grow dramatically in size and the ultimate retrieval accuracy will depend upon the performance of the local feature based re-ranking.

Such CDVS retrieval re-ranking solution suffers from the disadvantages of:

Bit rate efficiency: For a given query bit budget, all local features (and their coordinates) for re-ranking are compressed and sent over to the server in one batch. Experience now shows that this is typically unnecessary as only a small number of local features are needed in the re-ranking process.

Query quality: Due to the waste of the bandwidth, the coding of local features and coordinates are suffering from heavy quantization, in order to accommodate all local features identified.

Computational complexity: Local feature matching and coordinates verification puts a heavy burden on the visual search server 102, such that as the image repository 101 size and number of concurrent queries grows, the scalability of the computational complexity becomes a more significant issue.

Re-ranking performance: Local feature matching alone only captures local salient information from the query images, whereas the global feature captures the distribution of the local features in the descriptor space, not in the spatial domain. The results are inadequate as intuitions indicate that some holistic appearance features are necessary in image identification.

To address those disadvantages of the CDVS retrieval solution illustrated in FIG. 2, and motivated by the rate-less erasure correction coding schemes [REF6], an incremental visual query processing system that includes holistic feature feedbacks is employed. Initial simulation has shown that the proposed solution has benefits in retrieval accuracy, communication efficiency and computational complexity offloading.

Figure 3:
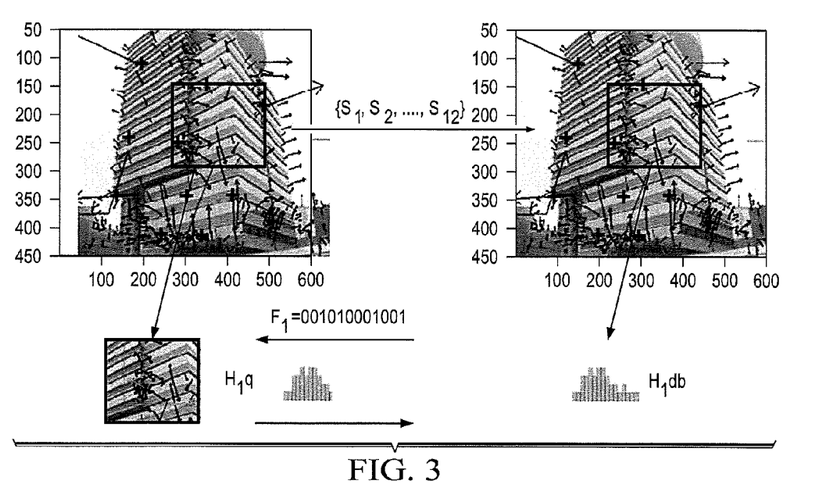
FIG. 3 illustrates incremental visual query processing with holistic feature feedback in accordance with one embodiment of the present disclosure.
Figure 4A:
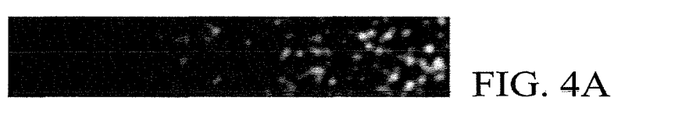
FIGS. 4A through 4D and FIGS. 4E through 4H illustrate examples of SIFT points detected at different peak and edge strength levels, respectively.
Figure 4B:
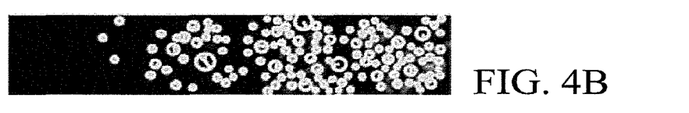
Figure 4C:
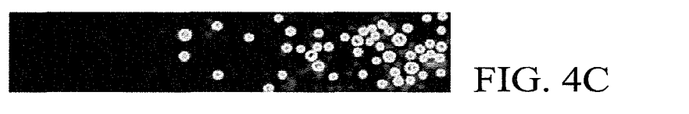
Figure 4D:
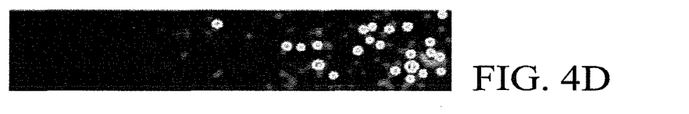
Figure 4E:
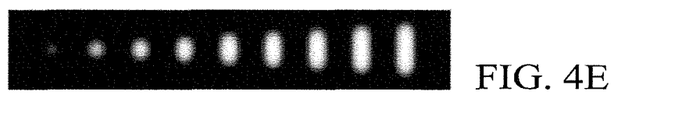
Figure 4F:
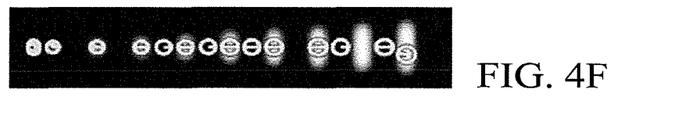
Figure 4G:
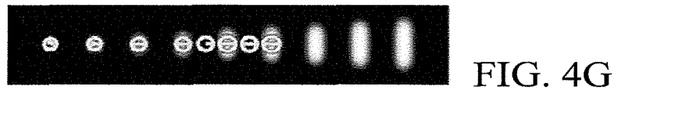
Figure 4H:
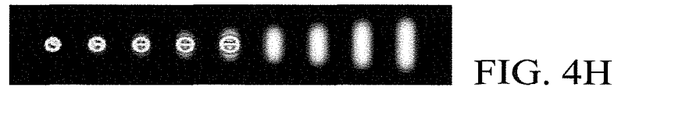

FIG. 3 illustrates incremental visual query processing with holistic feature feedback in accordance with one embodiment of the present disclosure. Instead of sending local features and coordinates over to the visual search sever 102 in one batch, an iterative process is introduced. First, a priority score is introduced for each local SIFT feature detected in the image [REF7] based on the feature's edge strength $t_e$ and peak strength $t_p$. Edge strength ensures that SIFT features detected are sharp enough, while peak strength ensures that the SIFT points detected have sufficient energy to stand out in the detection phase. Stronger peak and edge strengths have high correlations to correct SIFT matching in image identification. Examples of SIFT points detected at different peak and edge strength levels [REF8] are illustrated in the FIGS. 4A through 4D and FIGS. 4E through 4H, respectively. In FIG. 4A, an original image with regions of various peak strength is shown. FIGS. 4B, 4C and 4D illustrate the same image with markers indicating SIFT points detected with $t_p$=10, 20, and 30, respectively. In FIG. 4E, an original image is shown with regions of various edge strength. SIFT detection results for $t_e$=10, 7.5, and 3.5 are illustrated in FIGS. 4F, 4G and 4H, respectively. Other information may also be utilized, either in lieu of or in addition to edge and peak strength. For example, location of the SIFT in both descriptor feature space as well as in the image domain could be employed, preferably together with edge and peak strength. However, edge and peak information have been determined to be the most relevant.

Referring again to FIG. 3, once a priority score is associated with each local SIFT feature within the image based on edge and peak strength, each local SIFT feature can be ranked according to that associated edge and peak strength. Assuming there are n SIFT points $S_1, S_2, \ldots, S_n$ detected within a query image in FIG. 3, instead of applying a single threshold and sending the top k SIFT points and coordinates to the visual search server 102 from the mobile device 105, an iterative process is introduced to send incremental queries to the server for re-ranking. As illustrated by example in FIG. 3, in iteration j=1, the top k=12 SIFT features (minus their location information) from the query image are compressed and sent over to the server 102. Matching results are fed back to the client as a k-bit matching flag $F_j$ (flag $F_1$ for iteration j=1 depicted in FIG. 3). Based on the matching flag, a minimum bonding box (MBB) is computed for the matched SIFT points on query image side, and holistic features such as a color and/or intensity histogram $H_j^q$ are computed, quantized and sent over to the server 103. Query histogram $H_1^q$ for iteration j=1 is depicted in FIG. 3. The histogram is compared with the histogram $H_j^{db}$ for matched SIFT point MBB on the sever side (server histogram $H_1^{db}$ for iteration j=1 depicted in FIG. 3). If a certain histogram distance threshold $d_{max}$ is crossed for the result of comparing query histogram $H_j^q$ and server histogram $H_j^{db}$, the server side (database) image is rejected as a non-match.

Figure 5:
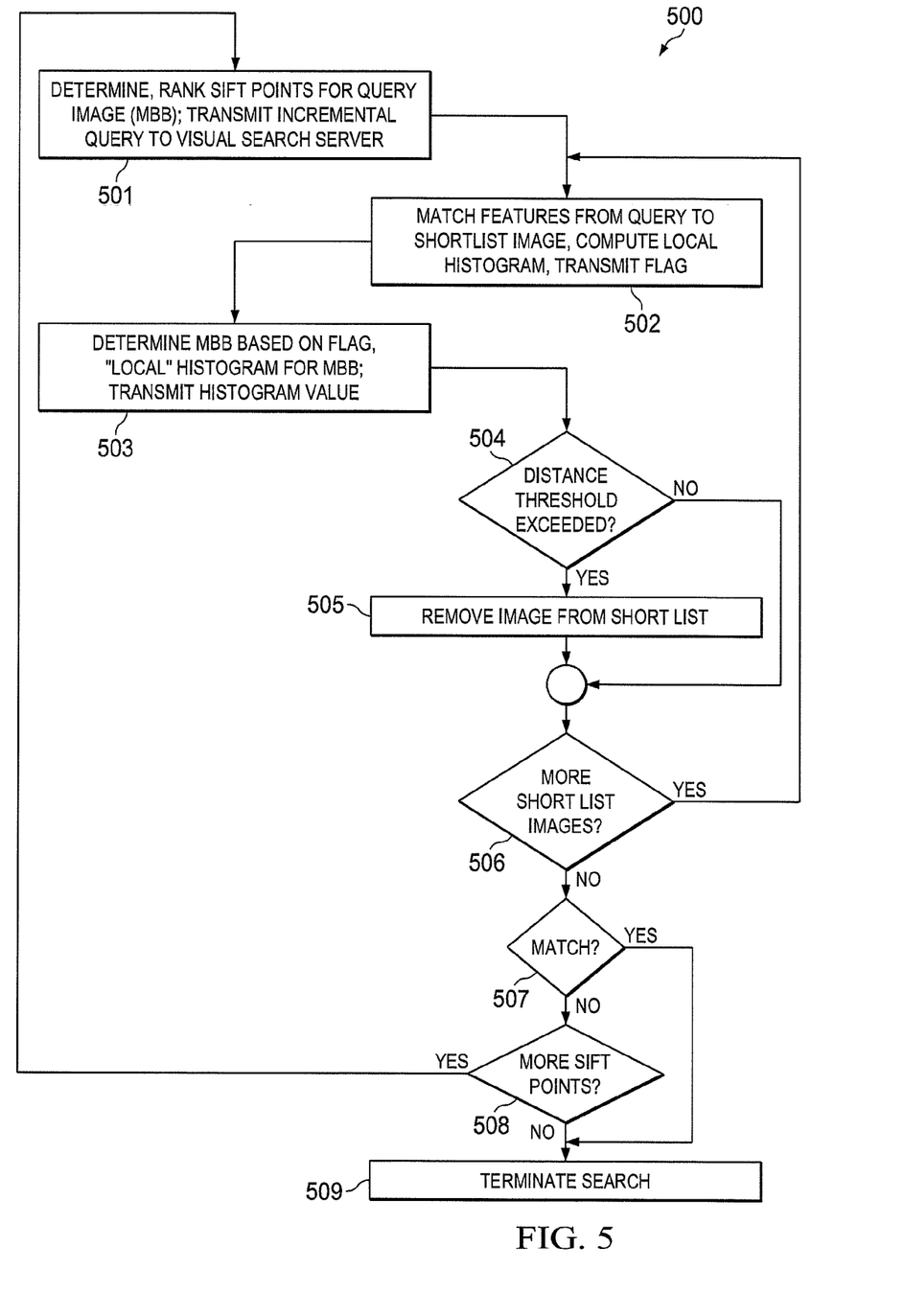
FIG. 5 is a high level flow diagram for a process of re-ranking during incremental visual query processing with holistic feature feedback in accordance with one embodiment of the present disclosure.

FIG. 5 is a high level flow diagram for a process of re-ranking during incremental visual query processing with holistic feature feedback in accordance with one embodiment of the present disclosure. The exemplary process 500 depicted is performed partially (steps on the right side) in the processor 110 of the visual search server 102 and partially (steps on the left side) in the processor 121 of the client mobile handset 105. While the exemplary process flow depicted in FIG. 5 and described below involves a sequence of steps, signals and/or events, occurring either in series or in tandem, unless explicitly stated or otherwise self-evident (e.g., a signal cannot be received before being transmitted), no inference should be drawn regarding specific order of performance of steps or occurrence of the signals or events, performance of steps or portions thereof or occurrence of signals or events serially rather than concurrently or in an overlapping manner, or performance of the steps or occurrence of the signals or events depicted exclusively without the occurrence of intervening or intermediate steps, signals or events. Moreover, those skilled in the art will recognize that complete processes and signal or event sequences are not illustrated in FIG. 5 or described herein. Instead, for simplicity and clarity, only so much of the respective processes and signal or event sequences as is unique to the present disclosure or necessary for an understanding of the present disclosure is depicted and described.

In the re-ranking process, for a given set of m short listed images $L=\{I_1, I_2, \ldots I_m\}$ identified during the global feature pruning just described, the incremental query-based re-ranking algorithm 500 operates as follows: First, ranked SIFT (or SURF, or any other suitable image-matching)

features $S_1, S_2, \ldots, S_n$ from the query image are sent from the client mobile station to the visual search server 102 in batches of k features as incremental query $Q_j$ (step 501). Next, local feature matching is performed (step 502) at the server between $Q_j$ and the short listed images $I_i$ that were not rejected in the previous iteration j–1, if any. "Local" histogram features for matched MBBs are computed on both server side (step 502) and the client side (step 503), with a flag from the server to the client (step 502) indicating to the client which of the k SIFT points should be employed to define the MBB. When the local histogram value for an MBB encompassing the matched features based on the flag is returned to the server from the client (step 503), a distance threshold $d_{max}$ is applied (step 504) to reject images from the short list (step 505). The process is repeated until either no images are left in the short list (step 506) or the relevance score, computed as summations of the histogram relevance in each iteration j for the n selected SIFT points (step 508), is satisfactory for the top-1 matching in the short list (step 507).

Pseudo code for the process of FIG. 5 is provided below:

```
I.    Compute a ranked list of SIFT S = {S₁, S₂, . . . ,Sₙ} from the query
      image
II.   Iteration count j = 0, batch size k = 16
III.  Init m-bit flag R = 1, relevance vector V = 0, at server for short list
      images L = {I₁, I₂, . . . ,Iₘ}
IV.   WHILE j * k < n
        □ Send incremental query Qⱼ = {Sⱼ*ₖ₊₁, Sⱼ*ₖ₊₂, . . . ,S₍ⱼ₊₁₎*ₖ} to the
          server
        □ FOR i = 1 TO m                  // process short list
          ■ IF R(i)                       //remaining short list images
            □ Local feature match between Qⱼ and Iᵢ from L, compute local
              histogram Hⱼᵈᵇ, send client match flag Fⱼⁱ
            □ Client computes matching SIFT MBB histogram Hⱼᵠ
            □ IF d(Hⱼᵠ, Hⱼᵈᵇ) > d_max     // check for holistic feature distance
              ■ R(i) = 0;
            □ ELSE                        // relevance score accounting
              ■ Vᵢ = Vᵢ + exp (-a * d(Hⱼᵠ, Hⱼᵈᵇ))
            □ END
          ■ END
        □ END
        □ j = j + 1                       // all short list images rejected,
                                          // no matching, early termination
          ■ BREAK;
        □ ELSE-IF max(V) > v_max          // found matches, early termination
          ■ BREAK;
        □ END
V.    END
```

As apparent, the process may terminate before all n selected SIFT points are considered if either all images are rejected as having too great a distance in histogram value from the query image or a "match" is determined based on the summations of histogram relevance. That is, the incremental query scheme described has the benefit of early termination of candidate images from the short list, therefore significantly reducing the computational complexity on the server as well as the communication cost of sending all local features to the server.

The first iteration discussed above necessarily encompasses all images for which information is stored within the database 101. However, the set L of short list images will quickly reduced based on only a subset (k=16 in the example above) of the n ranked features identified for the query image.

Experiment with the CDVS data set indicates that approximately 10 to 50 local feature matches are sufficient for image identification, whereas typically a single image will generate about 300 to 1,000 SIFT points if no pruning process is applied. The incremental query scheme described thus allows achieving lower number of local feature matches necessary in re-ranking, and therefore reduces both computational burdens on server and also the communication cost.

Notice that the scheme introduces extra overhead in the form of k-bit match flag as well as holistic feature information (typically on the order of 32 to 64 bits for a histogram representation) in the iterations. That overhead roughly corresponds to two local features in bit rate, and is a small fraction of average 300 local features involved in the query processing if all n determined features are sent in one batch.

In another embodiment, the proposed incremental query processing scheme can also work without the incremental query transmission. This will not save communication cost over the air, but still retains the benefits of computational complexity reduction on server.

For the holistic features, there are many options on the specific features that can be employed, e.g., color histogram, pixel intensity histogram, edge histogram, appearance models, etc.

The technical benefits of the incremental scheme described are three-folds: a) reduction in the communication cost by incremental query processing to achieve statistical gains in achieving lower number of local feature matching, b) significant reduction in the computational cost by allow early termination of the re-ranking process, and offloading of certain parts of computing to the client, which is especially important for real world deployment of the technology as mobile search and augmented reality applications are now dealing with image repositories of billions of entries, c) improvement in accuracy, as adding holistic features compliments local image patch based approaches embodied in SIFT and other key point based approaches.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
   receiving, at a visual search server, information relating to a first subset of distinctive features within a query image for a visual search request;
   for at least a subset of stored image information accessible to the visual search server, determining, at a visual search server, one or more sets of stored image information in which information relating to distinctive features for a respective image corresponds to at least a subset of the query image information; and
   for each of the one or more sets of stored image information in which information relating to distinctive features for a respective image corresponds to at least a subset of the query image information,
      transmitting a flag identifying the corresponding stored image information from the visual search server to a source of the visual search request,
      selecting a region from the query image using the flag;
      receiving, at the visual search server, holistic information from the visual search request source, the holistic information based upon the selected region, and
      using holistic information received at the visual search server from the visual search request source to evaluate a match between the respective image and the query image.

2. The method according to claim 1, wherein the subset of stored image information comprises a short list of sets of stored image information in which information relating to distinctive features for a respective image corresponded to at least a subset of information relating to a second subset of distinctive features within the query image.

3. The method according to claim 1, wherein the holistic information comprises one or more of a color histogram for the query image region, a pixel intensity histogram for the query image region, an edge histogram for the query image region, and an appearance model for the query image region.

4. The method according to claim 1, wherein the information relating to the first subset of distinctive features within the query image comprises one or more of a ranked edge strength and a ranked peak strength.

5. The method according to claim 1, wherein the first subset of distinctive features within the query image comprise k of n distinctive features, where k<n.

6. A visual search server, comprising:
one or more processors configured to receive, via a network connection, information relating to a first subset of distinctive features within a query image for a visual search request; and
a memory including a plurality of instructions that, when executed by the one or more processors, are configured to cause the one or more processors to:
determine, for at least a subset of stored image information accessible to the visual search server, one or more sets of stored image information in which information relating to distinctive features for a respective image corresponds to at least a subset of the query image information, and
for each of the one or more sets of stored image information in which information relating to distinctive features for a respective image corresponds to at least a subset of the query image information,
transmit a flag identifying the corresponding stored image information from the visual search server to a source of the visual search request,
select a region from the query image using the flag,
receive holistic information from the visual search request source, the holistic information based upon the selected region, and
use holistic information received at the visual search server from the visual search request source evaluate a match between the respective image and the query image.

7. The visual search server according to claim 6, wherein the subset of stored image information comprises a short list of sets of stored image information in which information relating to distinctive features for a respective image corresponded to at least a subset of information relating to a second subset of distinctive features within the query image.

8. The visual search server according to claim 6, wherein the holistic information comprises one or more of a color histogram for the query image region, a pixel intensity histogram for the query image region, an edge histogram for the query image region, and an appearance model for the query image region.

9. The visual search server according to claim 6, wherein the information relating to the first subset of distinctive features within the query image comprises one or more of a ranked edge strength and a ranked peak strength.

10. The visual search server according to claim 6, wherein the first subset of distinctive features within the query image comprise k of n distinctive features, where k<n.

11. A method, comprising:
transmitting a visual search request containing information relating to a first subset of distinctive features within a query image from a mobile device to a visual search server;
receiving, for each of the one or more sets of stored image information accessible to the visual search server in which information relating to distinctive features for a respective image corresponds to at least a subset of the query image information, a flag identifying the corresponding stored image information from the visual search server;
selecting a region from the query image using the flag;
computing holistic information based upon the selected region; and
transmitting the holistic information to the visual search server for use in evaluating a match between the respective image and the query image.

12. The method according to claim 11, wherein the subset of stored image information comprises a short list of sets of stored image information in which information relating to distinctive features for a respective image corresponded to at least a subset of information relating to a second subset of distinctive features within the query image.

13. The method according to claim 11, wherein the holistic information comprises one or more of a color histogram for the query image region, a pixel intensity histogram for the query image region, an edge histogram for the query image region, and an appearance model for the query image region.

14. The method according to claim 11, wherein the information relating to the first subset of distinctive features within the query image comprises one or more of a ranked edge strength and a ranked peak strength.

15. The method according to claim 11, wherein the first subset of distinctive features within the query image comprise k of n distinctive features, where k<n.

16. A mobile device, comprising:
a transceiver configured to:
transmit a visual search request containing information relating to a first subset of distinctive features within a query image from a mobile device to a visual search server, and
receive, for each of the one or more sets of stored image information accessible to the visual search server in which information relating to distinctive features for a respective image corresponds to at least a subset of the query image information, a flag identifying the corresponding stored image information from the visual search server;
a processor; and
a memory comprising a plurality of instructions that, when executed by the processor, are configured to cause the processor to:
select a region from the query image using the flag; and
compute holistic information based upon the selected region,
wherein the transceiver is further configured to transmit the holistic information to the visual search server for use in evaluating a match between the respective image and the query image.

17. The mobile device according to claim 16, wherein the subset of stored image information comprises a short list of sets of stored image information in which information relating to distinctive features for a respective image corresponded to at least a subset of information relating to a second subset of distinctive features within the query image.

18. The mobile device according to claim 16, wherein the holistic information comprises one or more of a color histogram for the query image region, a pixel intensity histogram for the query image region, an edge histogram for the query image region, and an appearance model for the query image region.

19. The mobile device according to claim 16, wherein the information relating to the first subset of distinctive features within the query image comprises one or more of a ranked edge strength and a ranked peak strength.

20. The mobile device according to claim 16, wherein the first subset of distinctive features within the query image comprise k of n distinctive features, where k<n.

* * * * *